United States Patent
De Lamberterie

(10) Patent No.: US 7,661,860 B2
(45) Date of Patent: Feb. 16, 2010

(54) LIGHTING AND/OR SIGNALLING DEVICE FOR A MOTOR VEHICLE

(75) Inventor: Antoine De Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 47 days.

(21) Appl. No.: 11/748,572

(22) Filed: May 15, 2007

(65) Prior Publication Data

US 2007/0268715 A1 Nov. 22, 2007

(30) Foreign Application Priority Data

May 16, 2006 (FR) .................................. 06 04341

(51) Int. Cl.
*F21V 7/00* (2006.01)
(52) U.S. Cl. .................. 362/516; 362/555; 362/558; 362/609; 362/560; 362/498
(58) Field of Classification Search ................ 362/609, 362/560, 516, 551, 555, 556, 558, 574, 576
See application file for complete search history.

(56) References Cited

U.S. PATENT DOCUMENTS

| | | | |
|---|---|---|---|
| 5,343,367 A | | 8/1994 | Davenport et al. |
| 5,365,412 A | * | 11/1994 | Koppolu et al. ............. 362/518 |
| 5,436,806 A | * | 7/1995 | Kato ............................ 362/511 |
| 5,575,551 A | * | 11/1996 | Horii .......................... 362/554 |
| 6,508,576 B2 | | 1/2003 | Emmelmann et al. |
| 6,805,456 B2 | * | 10/2004 | Okuwaki ..................... 362/626 |
| 6,824,284 B2 | * | 11/2004 | Chinniah et al. .............. 362/27 |
| 7,182,497 B2 | * | 2/2007 | Lee et al. .................... 362/555 |
| 7,210,815 B2 | * | 5/2007 | Imade ........................ 362/234 |
| 2001/0048601 A1 | | 12/2001 | Emmelmann et al. |
| 2003/0063476 A1 | * | 4/2003 | English et al. .............. 362/545 |
| 2005/0270798 A1 | * | 12/2005 | Lee et al. .................... 362/607 |

FOREIGN PATENT DOCUMENTS

| | | |
|---|---|---|
| DE | 4341801 | 6/1994 |
| DE | 10022420 | 11/2001 |
| EP | 1557605 | 7/2005 |
| JP | 2000331507 | 11/2000 |

* cited by examiner

*Primary Examiner*—Sandra L O'Shea
*Assistant Examiner*—Evan Dzierzynski
(74) *Attorney, Agent, or Firm*—Jacox, Meckstroth & Jenkins

(57) ABSTRACT

The invention relates to a lighting and/or signalling device for a motor vehicle for lighting in a longitudinal emission direction. The lighting and/or signalling device has:
 at least one light source emitting light rays; and
 at least one light guiding sheet in which the light rays issuing from the light source spread by successive reflections,
such that the guide sheet comprises at one end a reflective layer so as to redirect the light rays into the at least one sheet, and in that an output contour the sheet, at the end remote from the reflective layer, comprises a reflective profile, in particular inclined relative to the longitudinal axis of said sheet, so as to reflect the light rays reflected generally in an emission direction which is substantially parallel to said longitudinal axis.

21 Claims, 2 Drawing Sheets

LIGHTING AND/OR SIGNALLING DEVICE FOR A MOTOR VEHICLE

BACKGROUND OF THE INVENTION

1. Field of the Invention

The present invention relates to lighting or signalling devices for motor vehicles. More specifically, the present invention relates to a motor vehicle lighting device allowing light beams of varied shapes to be formed while maintaining sufficient intensity to produce a signalling light such as, for example, the daytime lights known as DRLs (daytime running lights).

2. Description of the Related Art

A device of this type generally comprises:
at least one light source emitting light rays,
at least one light guiding sheet in which the light rays issuing from the light source spread by successive reflections.

It is conventional to combine in a single housing a plurality of lighting or signalling functions so as to simplify the electrical wiring of these various functions in a motor vehicle. Each function comprises a light source, generally a reflector and optionally a lens, these various elements being arranged to provide a lighting or signalling beam, the geometric and photometric features of which have to comply with various regulations.

One solution for arranging a plurality of functions in a single housing is to use light guides so as thus to allow space to be saved.

Already known are light guides 18 shown in the example of FIG. 1. The light guides 18 are configured to extend in a circular pattern and they are disposed, for example, so as to surround the front perimeter of a passing beam headlamp. They generally comprise a face formed of a sequence of prisms or ridges and a cylindrical or toric output face. The prisms or ridges of the face send the light rays spreading into the guide toward the output face which provides therefrom an output beam which can, for example, fulfill the function of a parking light in a headlamp.

A solution of this type is particularly expensive since it requires a light source such as a halogen lamp, an elliptical reflector 10, a flexible fiber optic bundle 12 and a molded light guide 18, one of the faces of which is machined to form thereon prisms or ridges.

Moreover, this solution has the drawback that the light rays which spread into the guide are deflected in an uncontrolled manner by the ridges or the prisms, causing numerous losses in light intensity. The light beam produced has low intensity compared to the light source used at the start.

For specific functions requiring high intensity, it is necessary to have high-flux sources which are either expensive or tend to present heat problems, such as for example halogen-type lamps, rendering the design of the overall system expensive.

On the other hand, the periodic structure of the ridges or prisms is found in the emerging beam, so the light guide has a highly inhomogeneous appearance.

Therefore, the light guides forming a closed contour have inhomogeneities and often light points of greater intensity in the region of the bend 16 in the material of the light guide 18, and this further detracts from the quality of the lighting function and the visual quality of the device.

Finally, this solution has the drawback of a large overall size in order to be able to accommodate the light source, the reflector 10, the fiber optics 12 and the light guides 18.

Document EP-A-1,557,605 proposes a further lighting device which combines a plurality of reflectors, fiber optics and light guides and which requires a halogen lamp-type light source. Although this solution allows a specific number of functions to be included with a single lamp, it is expensive to carry out.

The prior documents do not propose effective solutions for obtaining a light beam with a particular shape and sufficient intensity to fulfill a lighting function such as the DRL function.

SUMMARY OF THE INVENTION

In order to respond to these problems, the present invention proposes a lighting and/or signalling device of the type described hereinbefore such that the guide sheet comprises at one end a reflective layer so as (still) to redirect the light rays into the sheet, and such that an output contour of the sheet, at the end remote from the reflective layer, comprises a reflective profile, in particular inclined relative to the longitudinal axis of the sheet, so as to reflect the light rays reflected generally in a longitudinal emission direction which is substantially parallel to this longitudinal axis.

Within the present invention, the terms "reflective profile" or "reflective layer" relating to the guide sheet designate their optical function: the surfaces in question are capable of reflecting (at least partially) the rays which reach them. However, these terms can cover any optical means allowing this reflection, two of which are of particular interest to the invention, namely:

a treatment of the surface in question, rendering it intrinsically reflective, whatever its profile. This concerns, in particular, the depositing of a thin reflective coating, in particular aluminizing by known methods;

a selection of the profile of the surface in question as a function of the angle of incidence of the rays to be reflected, so the rays are reflected onto the surface in accordance with the principle of total reflection.

It is also within the scope of the invention to combine these two means of reflection on the same surface: a reflective layer can thus be deposited over a portion of this surface and the layer broken off over the remainder of the surface which "operates", for its part, in total reflection. The delimitation between the zone to be aluminized and the zone in total reflection can be determined precisely by an optician.

According to further features of the invention:

the guide sheet extends in a plane substantially transverse to the emission direction;

the output contour has a concave arc of a circle-shaped profile, which can be located in particular in a plane transverse to the edge of the guide sheet;

the reflective layer of the guide sheet comprises a profile such that any ray reflected onto said reflective layer reaches substantially perpendicularly the output contour;

the reflective layer of the guide sheet has an ellipsoidal-type profile and the light source is arranged at a first focal point of the ellipsoidal profile and the center of the arc of a circle-shaped output contour is arranged at a second focal point in such a way that any ray reflected onto said reflective layer reaches substantially perpendicularly the output contour;

the reflective layer of the guide sheet comprises Fresnel optics in such a way that any ray reflected onto said reflective layer arrives substantially perpendicularly to the output contour;

the output contour comprises an output face, in a plane generally transverse and longitudinally offset relative to the guide sheet, and in that the output face comprises a profile, the shape of which is such that the light rays issuing from the sheet form an output beam generally parallel to the longitudinal axis of the device;

the guide sheet is a curved sheet extending toward the rear of the device;

the lighting device comprises what is known as a folded guide sheet comprising:

a first portion extending in a transverse plane; and a second portion extending in a longitudinal plane and arranged substantially perpendicularly relative to the first portion and the junction between the first portion and the second portion of the guide sheet comprises a reflective face, in particular inclined relative to the longitudinal axis, so as to reflect the rays reflected toward the output contour of the guide sheet;

the light source is arranged at the first focal point of the ellipsoidal profile of a reflective layer, in the first portion of what is known as the folded guide sheet;

the light source is arranged at the first focal point of the ellipsoidal profile of a reflective layer, in the second portion of what is known as the folded guide sheet;

the light source is preferably a light emitting diode, in particular emitting light rays radially. Preferably, it emits about the longitudinal axis in an apertural cone of approximately at most 50°, in particular approximately 30°, relative to the transverse plane of the device;

the guide sheet comprises:

a cylindrical cavity, the base of which is planar in a rear surface relative to the emission direction and in which the light source is arranged; and a prism shape generated by revolution on a front surface relative to the emission direction, formed with respect to the cylindrical cavity so as to reflect all rays issuing from the light source within the guide sheet;

and the light source is a light source emitting rays longitudinally in the general emission direction;

the light source comprises a source of light arranged at the end of a light guide and the other end of the light guide is arranged in the cavity having a planar base so as to direct the light rays into the guide sheet.

The invention also relates to a lighting and/or signalling module for a motor vehicle comprising a plurality of devices described hereinbefore radially distributed about the longitudinal axis of the module in a transverse plane so as to form an annular light beam.

According to further features, the lighting and/or signalling module comprises at least four devices, each comprising a light source and a guide sheet, radially distributed so as to form an annular light beam.

Further features and advantages of the invention will become apparent on reading the following detailed description, for the understanding of which reference will be made to the enclosed figures, in which:

DESCRIPTION OF THE PREFERRED EMBODIMENTS

Figure 1:
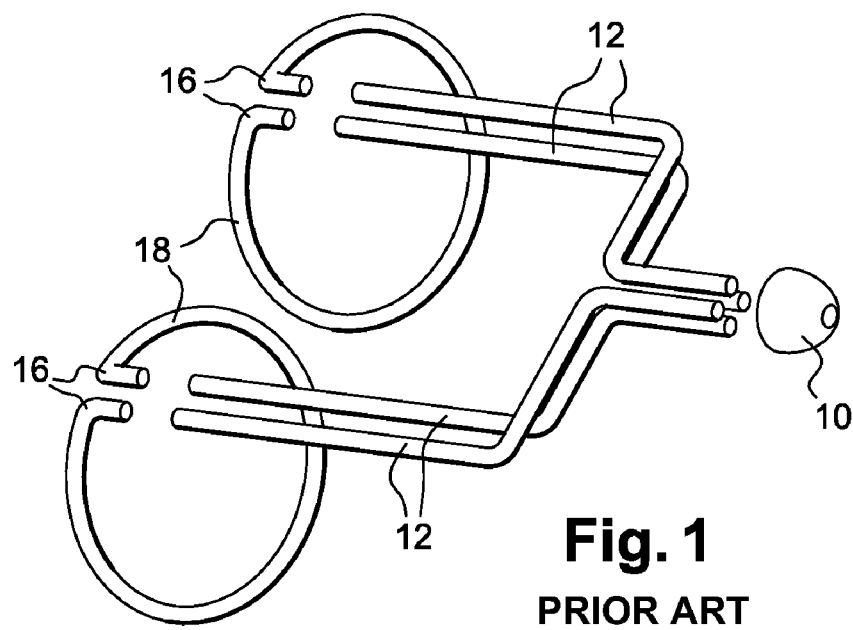
FIG. 1, to which reference has already been made, is a perspective view of an embodiment of the prior art.

In the following description, analogous, identical or similar elements will be denoted by the same reference numerals.

In the following description, the terms "longitudinal", "vertical" and "transverse" will be used with reference to the trihedron L, V, T shown in the figures and "front" and "rear" with reference to the general emission direction indicated in the figures by arrow F.

Figure 3:
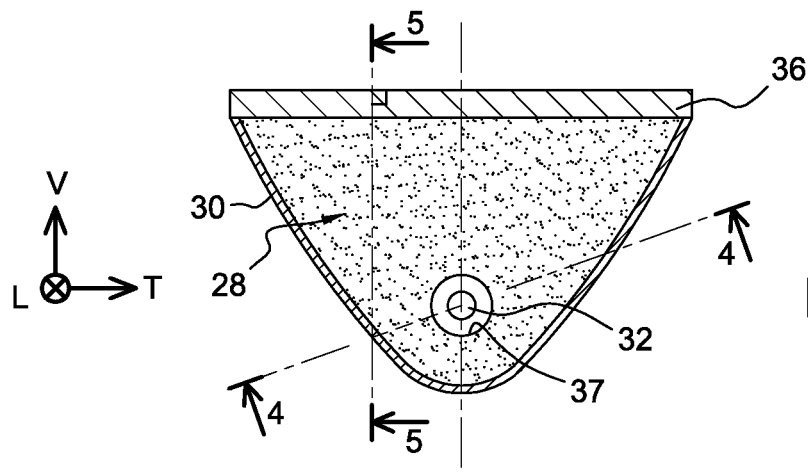
FIG. 3 is a schematic view of a lighting device according to the invention.

FIG. 3 is a view in a transverse plane of a lighting device for a motor vehicle according to the invention. In this embodiment, the device comprises mainly a guide sheet 28, a reflective layer 30, a light source 32 arranged in an orifice 37 and an output contour 36.

The guide sheet 28 is made of a transparent material having an index of refraction higher than the index of refraction of air such as glass or a plastics material. The guide sheet 28 is delimited longitudinally by two surfaces, a front surface 33 and a rear surface 35, which operate in total reflection: the light rays penetrating the guide sheet 28 via an input layer 34 spread in the thickness of the sheet by successive reflections over the front surface 33 and rear surface 35. According to a variation of the invention, the guide sheet 28 is made of a material having a high index of refraction so the light rays penetrating said sheet spread therein by successive reflections.

According to the embodiment of the invention illustrated in FIG. 3, the guide sheet 28 is a planar sheet extending in the transverse plane of the device.

In variations, the guide sheet 28 can be curved or of any other shape so as to take up as little space as possible in the lighting module while at the same time maintaining the same optical properties for reflection of the light rays. A specific embodiment of the guide sheet 28 will be returned to hereinafter.

The reflective layer 30 is an end of the guide sheet 28. This reflective layer 30 is arranged in the longitudinal plane so as to reflect into the guide sheet 28 any light rays spreading in the sheet 28.

According to a variation of the invention, the reflective layer 30 comprises a reflective inner surface allowing the light rays to be redirected into the guide sheet 28 by reflection. For example, the reflective layer is partly or completely aluminized to reflect the rays into the sheet 28.

According to a variation (not shown) of the invention, the reflective surface of the reflective layer 30 is replaced with Fresnel mirrors arranged in accordance with the profile of the reflective layer 30 so as to send the reflected light rays perpendicularly to the output contour 36.

The reflective layer 30 has a profile adapted to the shape of the output contour 36 in such a way that any ray reflected onto the layer 30 reaches the output contour 36 perpendicularly in the longitudinal plane.

Figure 4:
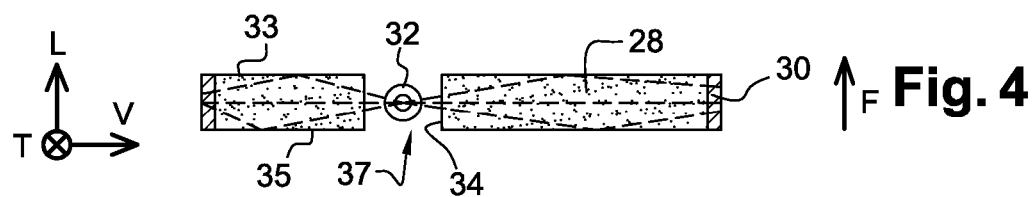
FIG. 4 is a section along the line 4-4 indicated in FIG. 3 of the device according to the invention.

The light source 32 is arranged in the orifice 37 to emit light rays into the guide sheet 28 via an input layer 34, as illustrated in FIG. 4.

The light source is advantageously designed so as to emit rays radially about its longitudinal axis, as illustrated in FIG. 4. More precisely, the light source emits rays at 360° about its longitudinal axis and in a cone of approximately 30° relative to the transverse axis of the guide sheet 28.

A source of this type can, for example, be what is known as a side emitter light emitting diode arranged in the cylindrical orifice 37 having a longitudinal axis formed in the guide sheet 28. The rays issuing from this source thus reach the input layer 34 perpendicularly and enter the guide sheet 28. Once the rays have penetrated the sheet 28, they are reflected by the reflective layer 30 so as to be redirected toward the output contour 36.

Figure 5:
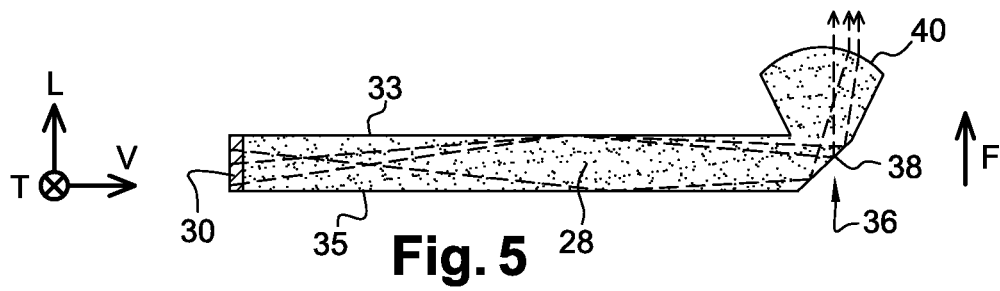
FIG. 5 is a section along the line 5-5 indicated in FIG. 3 of the device according to the invention.

The output contour 36, arranged at the other end of the guide sheet 28 and shown in longitudinal section in FIG. 5, comprises a reflective profile 38 and an output face 40.

The reflective profile 38 is inclined relative to the longitudinal axis in such a way that any ray issuing from the guide sheet 28 reaching the reflective profile 38 perpendicularly is reflected out of the transverse plane of the output contour 36 in a longitudinal emission direction F so as to fulfill a lighting or signalling function. In the case of a planar guide sheet 28 arranged in the transverse plane of the device, an angle of 45° is recommended.

The output contour 36 also comprises an output face 40 extending generally in a transverse plane. The output face 40 has, for example, a convex profile so as to collimate the rays issuing from the guide sheet 28 in order to create a lighting beam having generally parallel rays.

The output contour 36 is arranged in such a way that any ray reflected by the reflective layer 30 arrives perpendicularly to the output contour 36 in the transverse plane.

For a linear output contour 36 in the transverse plane, as illustrated in FIG. 3, the reflective layer 30 has a parabolic profile.

For an output contour 36 having curves in the transverse plane, the reflective layer 30 has an ellipsoidal profile adapted to each of the curves of the output contour 36 so as still to reflect the rays perpendicularly to the output contour 36.

Advantageously compared to the devices known in the art, the device of the invention as described hereinbefore provides much more satisfactory photometric results, providing in particular an output beam of much higher intensity than if use had been made of a prior-art device with a light source of the same intensity.

In the embodiment of FIG. 3, the output contour 36 is linear in the transverse plane. The lighting beam formed in this case will be a linear beam.

According to a further embodiment, the linear output contour 36 is replaced with an output contour of any desired shape so as to form a lighting beam having any desired shape insofar as the reflective layer 30 has a profile allowing the rays to be redirected perpendicularly to the output contour 36, as explained hereinbefore.

Figure 2:
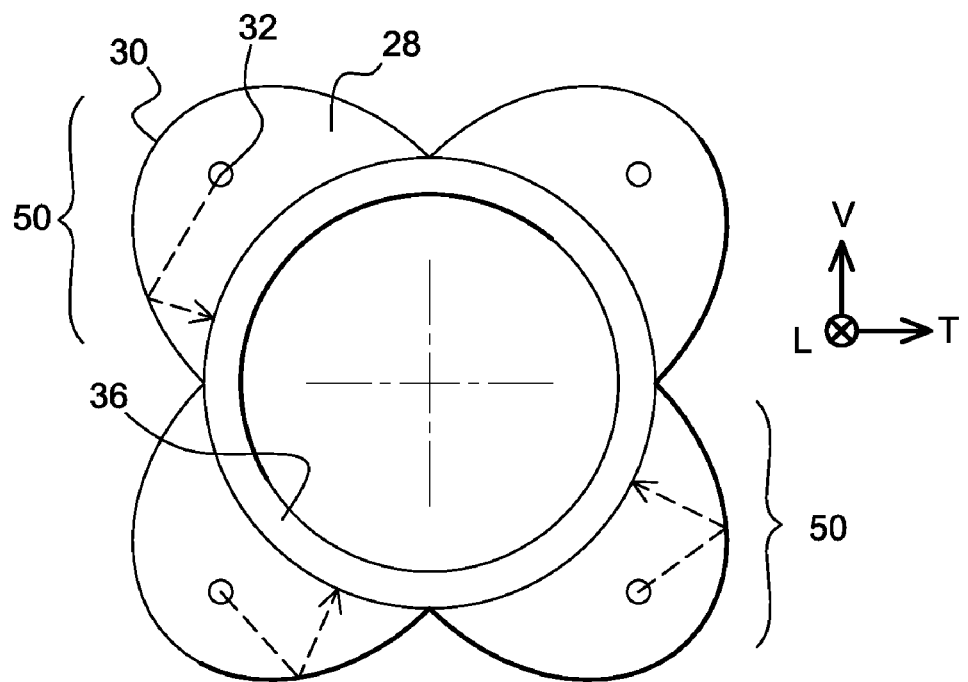
FIG. 2 is a schematic view in a transverse plane of the device according to the present invention.

FIG. 2 shows an output contour 36 of particular shape so as to form an output beam of annular shape.

The lighting device shown in FIG. 2 is composed in this case of four equal sectors 50 distributed uniformly about the longitudinal axis and each comprising, in particular, a guide sheet 28, a light source 32 and an output contour 36 in the shape of an arc of a circle, more specifically in the shape of a quarter circle.

The four sectors 50 arranged together provide a ring of light of moderate intensity issuing from the guide sheet 28 so as to fulfill, for example, a signalling function. This may be a daytime light function (daytime running light, DRL). In this case, the reflective layer 30 has an ellipsoidal-type profile.

The light source 32 is arranged at the first focal point of the ellipsoidal profile of the reflective layer 30, the output contour 36 is arranged in such a way that the centre of the arc of a circle coincides with the second focal point of the ellipsoidal profile of the reflective layer 30.

According to a variation (not shown) of the invention, the device is composed of from two to a number of sectors 50, distributed uniformly about the longitudinal axis, such as is required to form a beam of annular shape.

However, the four-sector configuration is the one having the advantage of taking up the minimum amount of space and of having the most advantageous photometric results. With four side emitter light emitting diode-type light sources, each having a power of 35 Lm, there is obtained an annular beam having a maximum intensity of approximately 1,800 Cd, whereas with the prior-art technologies merely approximately 160 Cd was attained with four diodes of equivalent power.

This configuration necessitates a few improvements in order to homogenize the output beam when viewed from a specific angle relative to the longitudinal axis.

According to a variation (not illustrated), the reflective profile 38 is formed so as to be slightly concave and so that its curvature varies in accordance with the position on the ring in order to prevent the beam from becoming inhomogeneous beyond a specific angle of observation relative to the longitudinal axis. This allows the light rays to be dispersed or concentrated locally in the transverse plane and the entire ring to be rendered more homogeneous for an observer, whatever the angle of observation.

According to a further variation, the output face 40 of the guide sheet 28 is formed so as to concentrate or disperse the emerging light rays in accordance with the position on the ring. The output face 40 is designed so as to be convex and to have a radius of curvature varying in accordance with the position on the ring in the same way as for the reflective profile 38 described hereinbefore.

In order to manage the homogeneity, ridges can also be formed in the region of the output face 40, ridges which will be more or less concentrated in accordance with the position on the ring so as to concentrate or disperse the emerging light rays.

Figure 6:
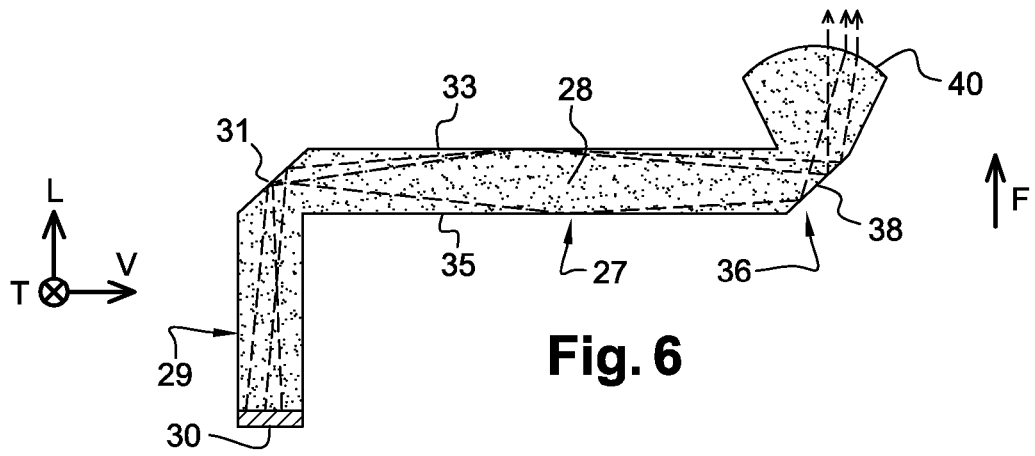
FIG. 6 is a schematic view in a longitudinal plane of a portion of the device according to a further embodiment of the invention.

In order to be able to adapt the device in an existing lighting module having limited available space, a variation of the invention proposes to "fold" the guide sheet, as illustrated in FIG. 6. The remainder of the device of the invention remains unchanged.

FIG. 6 is a section in a longitudinal plane of what is known as a folded guide sheet 28b. It should be noted that the "folded" guide sheet 28b is not obtained by folding of the guide sheet 28. Unlike a guide sheet 28 as described hereinbefore, the "folded" guide sheet 28b comprises two portions extending in differing planes.

The "folded" guide sheet 28b comprises a first portion 27 extending in a transverse plane and a second portion 29 extending in a longitudinal plane.

The two sheet portions 27 and 29 form a sole and single guide sheet 28b capable of directing light without discontinuities in the same way as a non-folded guide sheet 28 described hereinbefore.

For this purpose, the folded guide sheet 28b comprises a reflection face 31 arranged between the first portion 27 and the second portion 29 so as to reflect light from the reflection layer 30, which remains unchanged, up to the output contour 36, which remains unchanged.

The angle of inclination relative to the longitudinal axis of the reflection face 31 is chosen so as to render the folding of the sheet visually neutral relative to a non-folded sheet.

In the present case, in which the two sheet portions are perpendicular, an angle of 45° is recommended for this configuration.

The light source 32, for its part, can be arranged either in the first portion 27 or in the second portion 29.

If the light source 32 is arranged in the first portion 27, one portion of the rays is reflected directly by the reflective profile 38 and another portion of the rays is reflected onto the reflection face 31, then reflected onto the reflective layer 30, then again onto the reflection face 31, then onto the reflective profile 38 in order finally to emerge via the output face 40.

If the light source 32 is arranged in the second portion 29, the rays are reflected onto the reflective layer 30, then onto the reflection face 31, then onto the reflective profile 38 in order finally to emerge via the output face 40.

Figure 7:
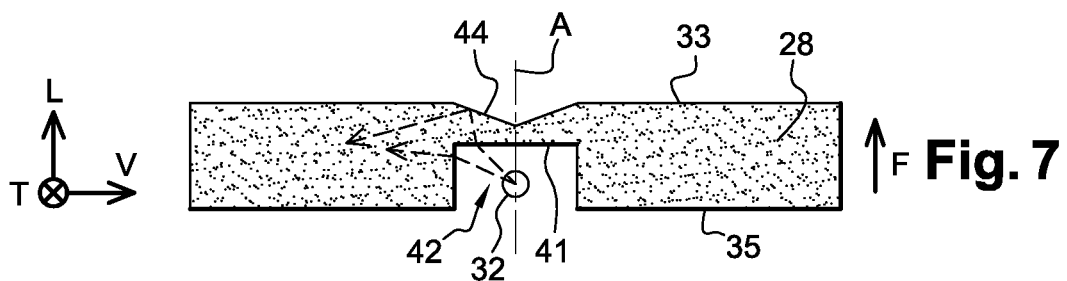
FIG. 7 is a longitudinal section of the device of the invention illustrating variation.

FIG. 7 shows a variation in the positioning of the light source 32 in the guide sheet 28.

Previously, the light source 32 was arranged in the orifice 37 within the guide sheet 28.

In the case of FIG. 4, the source 32 used is a side emitter-type light emitting diode, i.e. a diode emitting light rays radially about the longitudinal axis in a cone of approximately 30° relative to the transverse plane of the device. A diode of this type provides a distribution of light of this type generated by revolution by sending the light radially relative to the longitudinal axis of the light source 32.

According to a variation of the invention illustrated in FIG. 7, the guide sheet 28 is no longer perforated by an orifice 37 but it comprises in its rear surface 35 a cylindrical cavity 42 arranged symmetrically relative to an axis A and intended to receive the light source 32. The cylindrical cavity 42 is located at the first focal point of the ellipsoidal profile of the reflective layer 30 and comprises a planar base 41, against which the light source 32 is arranged.

Advantageously compared to the preceding embodiment, the cylindrical cavity 42 allows the arrangement of any type of light source, including conventional diode-type light sources, emitting light along the longitudinal axis, and these are much less expensive than what are known as side emitter diodes.

Moreover, the guide sheet 28 comprises in its front surface 33 a concave conical prism generated by revolution 44 formed in the front surface 33 of the sheet 28 along the same axis A as the cavity 42, allowing radial reflection of the rays emitted longitudinally by the light source 32 into the guide sheet 28. The same effect is thus obtained as when using a "side emitter" diode.

This embodiment allows selection of much more varied and less expensive sources such as conventional diodes emitting rays longitudinally or else the end of an optical guide arranged in the cavity 42 and conveying the light rays from a light source located at a different location and sending light rays via the other end of the optical guide. This embodiment also allows recovery of the maximum amount of radiation emitted by the light source 32 owing to the prism generated by revolution thus cut in the guide sheet 28.

This configuration allows a portion of the reflected rays which would recross the light source 32 to pass above the source 32, thus further increasing the performance levels of this device.

The present invention is not limited to the embodiments described in this document; it also encompasses variations and combinations of the embodiments described hereinbefore.

What is claimed is:

1. A device for a motor vehicle for lighting or signalling in a longitudinal emission direction, said device comprising:
   at least one light source emitting light rays; and
   at least one light guide sheet in which the light rays issuing from said at least one light source spread by successive reflections;
   wherein said at least one light guide sheet comprises at one end a reflective layer so as to redirect the light rays into said at least one light guide sheet, an output contour of said at least one light guide sheet, at an end remote from the reflective layer, comprises a reflective profile inclined relative to a longitudinal axis of said at least one light guide sheet, so as to reflect the light rays generally in an emission direction which is substantially parallel to said longitudinal axis, said output contour being generally annular or circular;
   wherein the reflective layer of said at least one light guide sheet has an ellipsoidal profile, the at least one light source being arranged at a first focal point of the ellipsoidal profile and the center of the arc of a circle-shaped output contour is arranged at a second focal point.

2. The device according to claim 1, wherein said at least one light guide sheet extends in a plane substantially transverse to said emission direction.

3. The device according to claim 1, wherein said output contour has a concave arc of a circle-shaped profile, in a plane substantially transverse to an edge of said at least one light guide sheet.

4. The device according to claim 1, wherein the reflective layer of said at least one light guide sheet comprises a reflective profile such that any ray reflected onto said reflective layer reaches substantially perpendicularly said output contour.

5. The device according to claim 1, wherein said reflective layer of said at least one light guide sheet comprises Fresnel optics in such a way that any ray reflected onto said reflective layer travels in said at least one light guide sheet and in a plane that is substantially perpendicular to said longitudinal emission direction.

6. The device according to claim 1, wherein said output contour comprises an output face, in a plane generally transverse and longitudinally offset relative to said at least one light guide sheet, and in that the output face comprises a profile, the shape of which is such that the light rays issuing from said at least one light guide sheet form an output beam generally parallel to the longitudinal axis of the device.

7. The device according to claim 1, wherein said one end is a curved surface having said reflective layer extending toward the rear of the device.

8. The device according to claim 1, which comprises a folded guide sheet comprising:
   a first portion extending in a transverse plane; and
   a second portion extending in a longitudinal plane and arranged substantially perpendicularly relative to the first portion
   and in that the junction between the first portion and the second portion of said at least one light guide sheet comprises a reflective face, in particular inclined relative to the longitudinal axis of said at least one light guide sheet, so as to reflect substantially all the light rays reflected toward the output contour of said at least one light guide sheet.

9. The device according to claim 1, wherein the at least one light source is a light emitting diode, emitting light rays radially, in particular about the longitudinal axis in a cone of approximately at most 50°, in particular approximately 30°, relative to the transverse plane of the device.

10. The device for a motor vehicle, which comprises a plurality of devices described in claim 1, radially distributed about the longitudinal axis of the module in a transverse plane so as to form an annular light beam.

11. The device for a motor vehicle according to claim 10, which comprises at least four devices, each comprising a light source and a guide sheet, radially distributed so as to form an annular light beam.

12. The device as recited in claim 1, wherein said at least one light source comprises a plurality of devices directing light rays toward said longitudinal axis.

13. A device for a motor vehicle for providing lighting or signalling in a longitudinal emission direction, said device comprising:
   at least one light source emitting light rays; and
   at least one light guide sheet in which the light rays issuing from said at least one light source spread by successive reflections;
   wherein said at least one light guide sheet comprises at one end a reflective layer so as to redirect the light rays into said at least one light guide sheet, an output contour of said at least one light guide sheet, at an end remote from the reflective layer, a reflective profile inclined relative to a longitudinal axis of said at least one light guide sheet, so as to reflect the light rays toward said output contour so that the light rays issuing from said output contour are emitted parallel to said longitudinal emission direction,
   said device further comprising a folded guide sheet comprising:
   a first portion extending in a transverse plane; and
   a second portion extending in a longitudinal plane and arranged substantially perpendicularly relative to the first portion
   and in that the junction between the first portion and the second portion of said at least one light guide sheet comprises a reflective face, in particular inclined relative to the longitudinal axis of said at least one light guide sheet, so as to reflect substantially all the light rays reflected toward the output contour of said at least one light guide sheet;
   wherein the at least one light source is arranged at a first focal point of an ellipsoidal profile of a reflective layer, in the first portion of what is known as the folded guide sheet.

14. A device for a motor vehicle for providing lighting or signalling in a longitudinal emission direction, said device comprising:
   at least one light source emitting light rays; and
   at least one light guide sheet in which the light rays issuing from said at least one light source spread by successive reflections;
   wherein said at least one light guide sheet comprises at one end a reflective layer so as to redirect the light rays into said at least one light guide sheet, an output contour of said at least one light guide sheet, at an end remote from the reflective layer, a reflective profile inclined relative to a longitudinal axis of said at least one light guide sheet, so as to reflect the light rays toward said output contour so that the light rays issuing from said output contour are emitted parallel to said longitudinal emission direction;
   said device further comprising a folded guide sheet comprising:
   a first portion extending in a transverse plane; and
   a second portion extending in a longitudinal plane and arranged substantially perpendicularly relative to the first portion
   and in that the junction between the first portion and the second portion of said at least one light guide sheet comprises a reflective face, in particular inclined relative to the longitudinal axis of said at least one light guide sheet, so as to reflect the rays reflected toward the output contour of said at least one light guide sheet;
   wherein the at least one light source is arranged at a first focal point of an ellipsoidal profile of the reflective layer, in the second portion of what is known as the folded guide sheet.

15. A device for a motor vehicle for providing lighting or signalling in a longitudinal emission direction, said device comprising:
   at least one light source emitting light rays; and
   at least one light guide sheet in which the light rays issuing from said at least one light source spread by successive reflections;
   wherein said at least one light guide sheet comprises at one end a reflective layer so as to redirect the light rays into said at least one light guide sheet, an output contour of said at least one light guide sheet, at an end remote from the reflective layer, a reflective profile inclined relative to a longitudinal axis of said at least one light guide sheet, so as to reflect the light rays toward said output contour so that the light rays issuing from said output contour are emitted parallel to said longitudinal emission direction;
   wherein said at least one light guide sheet extends in a plane substantially transverse to said emission direction;
   wherein said at least one light guide sheet comprises:
   a cylindrical cavity, the base of which is planar in a rear surface relative to the emission direction and in which the at least one light source is arranged; and
   a prism shape generated by revolution on a front surface relative to the emission direction, formed with respect to the cylindrical cavity so as to reflect all rays issuing from said at least one light source within said at least one light guide sheet and in that said at least one light source is a light source emitting rays longitudinally in a general emission direction.

16. The device according to claim 15, wherein said at least one light source comprises a source of light arranged at the end of a light guide and in that the other end of the light guide is arranged in a cavity having a planar base so as to direct the light rays into said at least one light guide sheet.

17. A device for a motor vehicle for providing lighting or signalling in a longitudinal emission direction, said device comprising:
   at least one light source emitting light rays; and
   at least one light guide sheet in which the light rays issuing from said at least one light source spread by successive reflections;
   wherein said at least one light guide sheet comprises at one end a reflective layer so as to redirect the light rays into said at least one light guide sheet, an output contour of said at least one light guide sheet, at an end remote from the reflective layer, a reflective profile inclined relative to a longitudinal axis of said at least one light guide sheet, so as to reflect the light rays toward said output contour so that the light rays issuing from said output contour are emitted parallel to said longitudinal emission direction;
   wherein the reflective layer of said at least one light guide sheet has an ellipsoidal profile, the at least one light source is arranged at a first focal point of the ellipsoidal profile and a center of the arc of a circle-shaped output contour being arranged at a second focal point.

18. The device according to claim 17, wherein said at least one light guide sheet extends in a plane substantially transverse to an emission direction.

19. The device according to claim 17, wherein said output contour has a concave arc of a circle-shaped profile in a plane substantially transverse to an edge of said at least one light guide sheet.

20. The device according to claim 17, wherein said reflective layer of said at least one light guide sheet comprises a reflective profile such that any ray reflected onto said reflective layer reaches substantially perpendicular said output contour.

21. The device according to claim 17, wherein said reflective layer of said at least one light guide sheet comprises Fresnel optics in such a way that any ray reflected onto said reflective layer arrives substantially perpendicular to said output contour.

* * * * *